US011568689B2

(12) United States Patent
Nix et al.

(10) Patent No.: US 11,568,689 B2
(45) Date of Patent: *Jan. 31, 2023

(54) SYSTEMS AND METHODS TO OBTAIN FEEDBACK IN RESPONSE TO AUTONOMOUS VEHICLE FAILURE EVENTS

(71) Applicant: UATC, LLC, San Francisco, CA (US)

(72) Inventors: Molly Castle Nix, San Francisco, CA (US); Sean Chin, Pittsburgh, PA (US); Dennis Zhao, Pittsburgh, PA (US)

(73) Assignee: UATC, LLC, Mountain View, CA (US)

(*) Notice: Subject to any disclaimer, the term of this patent is extended or adjusted under 35 U.S.C. 154(b) by 503 days.

This patent is subject to a terminal disclaimer.

(21) Appl. No.: 16/741,282

(22) Filed: Jan. 13, 2020

(65) Prior Publication Data
US 2020/0151973 A1 May 14, 2020

Related U.S. Application Data

(63) Continuation of application No. 15/625,255, filed on Jun. 16, 2017, now Pat. No. 10,559,140.

(51) Int. Cl.
G06F 17/00 (2019.01)
G07C 5/08 (2006.01)
(Continued)

(52) U.S. Cl.
CPC ............ G07C 5/0841 (2013.01); B60K 35/00 (2013.01); B60W 50/14 (2013.01);
(Continued)

(58) Field of Classification Search
CPC .... G07C 5/0841; G07C 5/0825; B60K 35/00; B60K 2370/115; B60K 2370/119;
(Continued)

(56) References Cited

U.S. PATENT DOCUMENTS 6,314,422 B1 11/2001 Barket et al.
10,559,140 B2 * 2/2020 Nix ...................... G07C 5/0841
(Continued)

FOREIGN PATENT DOCUMENTS

AU 2017100444 5/2017
DE 102014013960 3/2016
(Continued)

OTHER PUBLICATIONS

PCT International Search Report and Written Opinion for PCT/US2018/037757, dated Oct. 8, 2018, 13 pages.

Primary Examiner — Ronnie M Mancho
(74) Attorney, Agent, or Firm — Dority & Manning, P.A.

(57) ABSTRACT

The present disclosure provides systems and methods to obtain feedback descriptive of autonomous vehicle failures. In particular, the systems and methods of the present disclosure can detect that a vehicle failure event occurred at an autonomous vehicle and, in response, provide an interactive user interface that enables a human located within the autonomous vehicle to enter feedback that describes the vehicle failure event. Thus, the systems and methods of the present disclosure can actively prompt and/or enable entry of feedback in response to a particular instance of a vehicle failure event, thereby enabling improved and streamlined collection of information about autonomous vehicle failures.

20 Claims, 8 Drawing Sheets

(51) Int. Cl.
*B60W 50/14* (2020.01)
*B60K 35/00* (2006.01)
*G01C 21/36* (2006.01)
*G05D 1/02* (2020.01)

(52) U.S. Cl.
CPC ....... *G01C 21/3697* (2013.01); *G07C 5/0825* (2013.01); *B60K 2370/115* (2019.05); *B60K 2370/119* (2019.05); *B60K 2370/1438* (2019.05); *B60K 2370/15* (2019.05); *B60K 2370/175* (2019.05); *B60K 2370/186* (2019.05); *B60K 2370/52* (2019.05); *B60K 2370/566* (2019.05); *B60W 2050/146* (2013.01); *B60W 2540/215* (2020.02); *G05D 1/021* (2013.01)

(58) Field of Classification Search
CPC ........ B60K 2370/1438; B60K 2370/15; B60K 2370/175; B60K 2370/186; B60K 2370/52; B60K 2370/566; B60W 50/14; B60W 2050/146; B60W 2540/215; G01C 21/3697; G05D 1/021
USPC .......................................................... 701/23
See application file for complete search history.

(56) References Cited

U.S. PATENT DOCUMENTS

| | | |
|---|---|---|
| 2008/0161988 A1 | 7/2008 | Oesterling et al. |
| 2014/0357295 A1 | 12/2014 | Skomra et al. |
| 2015/0088358 A1 | 3/2015 | Yopp |
| 2018/0364711 A1 | 12/2018 | Goldfain et al. |
| 2020/0151973 A1* | 5/2020 | Nix .................. B60K 35/00 |

FOREIGN PATENT DOCUMENTS

| | | |
|---|---|---|
| DE | 102015007242 | 12/2016 |
| DE | 102015210428 | 12/2016 |
| WO | WO 2016/109540 | 7/2016 |

* cited by examiner

SYSTEMS AND METHODS TO OBTAIN FEEDBACK IN RESPONSE TO AUTONOMOUS VEHICLE FAILURE EVENTS

PRIORITY CLAIM

The present application is a continuation of U.S. application Ser. No. 15/625,255 having a filing date of Jun. 16, 2017. Applicant claims priority to and the benefit of each of such applications and incorporate all such applications herein by reference in its entirety.

FIELD

The present disclosure relates generally to autonomous vehicles. More particularly, the present disclosure relates to systems and methods to obtain feedback in response to autonomous vehicle failure events.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors and one or more non-transitory computer readable media that collectively store instructions that, when executed by the one or more processors, cause the computing system to perform operations. The operations include determining that a vehicle failure event occurred at an autonomous vehicle. The operations include, in response to determining that the vehicle failure event occurred, providing an interactive user interface that enables a human located within the autonomous vehicle to enter feedback that describes the vehicle failure event. The operations include receiving the feedback entered by the human located within the autonomous vehicle via the interactive user interface. The operations include associating the feedback with one or more of: a time at which the vehicle failure event occurred, a location at which the vehicle failure event occurred, and data collected by the autonomous vehicle contemporaneous to the vehicle failure event.

Another example aspect of the present disclosure is directed to a computer-implemented method to obtain feedback descriptive of autonomous vehicles failures. The method includes determining, by a computing system that includes one or more computing devices, that a vehicle failure event occurred at an autonomous vehicle. The method includes, in response to determining that the vehicle failure event occurred, providing, by e computing system, an interactive user interface that enables a human located within the autonomous vehicle to enter feedback that describes the vehicle failure event. The method includes receiving, by the computing system, the feedback entered by the human located within the autonomous vehicle via the interactive user interface. The method includes associating, by the computing system, the feedback with one or more of: a time at which the vehicle failure event occurred, a location at which the vehicle failure event occurred, and data collected by the autonomous vehicle contemporaneous to the vehicle failure event.

Another example aspect of the present disclosure is directed to one or more non-transitory computer-readable media that collectively store instructions that, when executed by one or more processors, cause a computing system to perform operations. The operations include determining that a vehicle failure event occurred at an autonomous vehicle. The operations include, in response to determining that the vehicle failure event occurred, providing an interactive user interface that enables a human located within the autonomous vehicle to enter feedback that describes the vehicle failure event. The operations include receiving the feedback entered by the human located within the autonomous vehicle via the interactive user interface. The operations include associating the feedback with at least one of: a time at which the vehicle failure event occurred, a location at which the vehicle failure event occurred, and data collected by the autonomous vehicle contemporaneous to the vehicle failure event.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
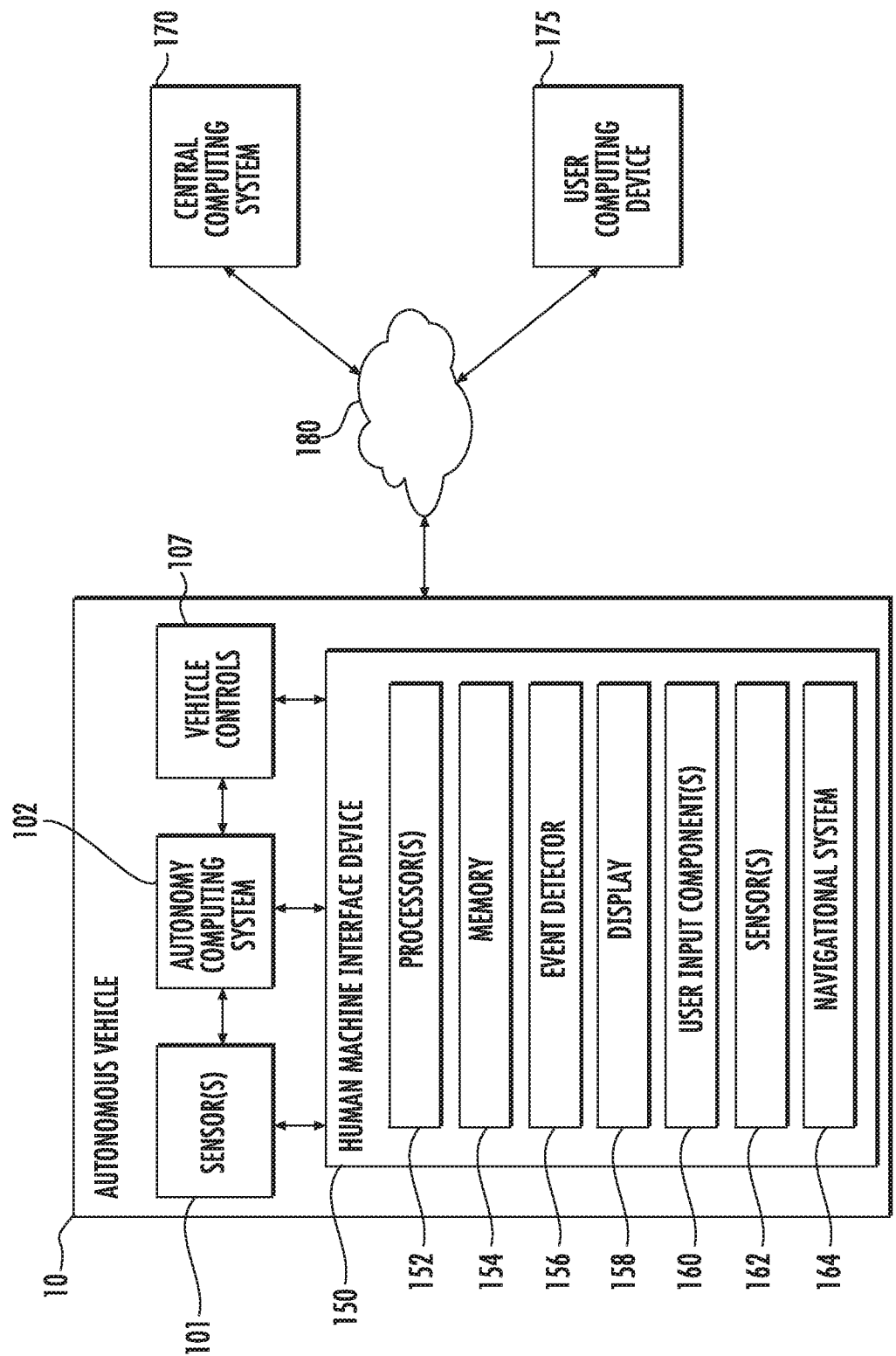
FIG. 1 depicts a block diagram of an example computing system according to example embodiments of the present disclosure.

Generally, the present disclosure is directed to systems and methods to obtain feedback descriptive of autonomous vehicle failures. In particular, the systems and methods of the present disclosure can detect that a vehicle failure event occurred at an autonomous vehicle and, in response, provide an interactive user interface that enables a human located within the autonomous vehicle to enter feedback that describes the vehicle failure event. Thus, the systems and methods of the present disclosure can actively prompt and/or enable entry of feedback in response to a particular instance of a vehicle failure event, thereby enabling improved and streamlined collection of information about autonomous vehicle failures.

More particularly, one aspect of developing, operating, and refining autonomous vehicle technology is continuously testing and evaluating the performance of autonomous vehicles. As an example, during operation of an autonomous vehicle to perform an autonomous driving session, the autonomous vehicle can experience one or more vehicle failure events. As one example, vehicle failure events can include instances in which a human operator was required to or chose to intervene and assume manual control of the autonomous vehicle. For example, the autonomous vehicle may have been unable to determine an appropriate motion path through its environment and, therefore, came to a stop or otherwise became "frozen." As another example, vehicle failure events can include instances in which the autonomous vehicle collided with an object or nearly collided with an object. As yet another example, vehicle failure events can include instances in which the autonomous vehicle performed a driving maneuver that was uncomfortable for a human passenger or otherwise undesirable.

Thus, as used herein, the term "vehicle failure event" does not necessarily correspond to or require instances in which the autonomous vehicle was unable to operate at all or collided or nearly collided with another object; but instead more generally refers to any instance in which the autonomous vehicle operated in a fashion that was undesirable for some reason, including, for example, passenger comfort, human safety, vehicle efficiency, and/or other objectives. Thus, a vehicle failure event can include any notable incident, such as an incident that has an impact on ride quality even if no part of the autonomous vehicle control system actually failed.

Diagnosing and resolving such vehicle failure events can assist in ensuring that such vehicle failure events do not reoccur and, more generally, improving the autonomous vehicle technology as a whole. One aspect of diagnosing and resolving vehicle failure events is to identify when vehicle failure events occur and to collect information regarding the occurrence of the vehicle failure event. In particular, vehicle failure events may be assignable to a number of different categories or types of vehicle failure events. For example, vehicle failure events can include intersection failure events (e.g., turning failure events, stopping failure events, etc.); object failure events; zone issues failure events; non-behavior related failure events; straight line speed failure events; straight line position failure events; lane change failure events; and/or various other types of failure events.

To facilitate collection of feedback descriptive of such vehicle failure events, the present disclosure provides systems and methods that utilize interactive user interfaces to enable a human located within the autonomous vehicle to enter feedback. In particular, according to an aspect of the present disclosure, the systems and methods of the present disclosure can determine that a vehicle failure event occurred at an autonomous vehicle and, in response, prompt the human to provide feedback descriptive of the vehicle failure event. For example, the feedback can describe one or more of: a criticality of the event; a type of the event; a cause of the event; the human's subjective response to the event (e.g., level of comfort and/or satisfaction); and/or other attributes of the event. In such fashion, human feedback regarding specific instances and/or types of vehicle failure events can be collected, enabling more advanced and granular understanding and refinement of the autonomous vehicle technology relative to particular types of vehicle failure events and/or particular physical locations.

The feedback collection systems of the present disclosure can include or otherwise be implemented by one or more computing devices. For example, some or all of the computing devices can be located on-board an autonomous vehicle.

Some example systems of the present disclosure include a human machine interface device that facilitates interaction between the autonomous vehicle and a human located within the autonomous vehicle. For example, the human machine interface device can be located on-board the autonomous vehicle and can facilitate interaction between the human and an autonomy computing system of the autonomous vehicle that controls the motion of the autonomous vehicle.

In some implementations, the human machine interface device can include a display device and/or other input/output components that provide an interactive user interface (e.g., through which the human can provide feedback). For example, the display device can be a front-seat display device that is accessible by one or both of a passenger that is located in a front passenger seat of the autonomous vehicle and a driver that is located in a driver seat of the autonomous vehicle.

In some implementations, in addition or alternatively to the human machine interface device, the systems and methods of the present disclosure can include or leverage a user computing device (e.g., smartphone) that is associated with the human. For example, in some implementations, in addition or alternatively to the display of the user interface by the human machine interface device, the interactive user interface can be provided on or accessible via a display of the user computing device. In yet further implementations, certain operations described herein can be performed by a central computing system that is remotely located to the autonomous vehicle and in communication with the autonomous vehicle over one or more wireless networks (e.g., cellular data networks).

According to an aspect, the systems of the present disclosure can determine that a vehicle failure event occurred at an autonomous vehicle. For example, the human machine interface device, the autonomy computing system, and/or other communicatively coupled devices or systems can include an event detector that continuously, near-continuously, or periodically assesses available data to determine that a vehicle failure event occurred at an autonomous vehicle. Example types of vehicle failure events are described herein.

In some implementations, the systems of the present disclosure can determine that a vehicle failure event occurred based at least in part on data indicative of a human intervention event in which a human driver assumed control of the autonomous vehicle. For example, the intervention may have been required or optional. According to an aspect of the present disclosure, upon detection of such a human intervention event, the interactive user interface can automatically prompt the human to provide feedback. Thus, human feedback can be actively prompted whenever a human intervention event occurs, resulting in increased collection of human feedback descriptive of specific instances in which human intervention was required or otherwise performed.

In some implementations, the systems of the present disclosure can determine that a vehicle failure event occurred based at least in part on a human input from the human that requests the ability to enter the feedback. For example, the human machine interface device can continuously display the user interface during operation. The user interface can include a feedback icon that, when selected by the human, indicates the human would like to enter feedback information. Thus, selection of the feedback icon by the human can indicate that a vehicle failure event occurred. In response to human input that requests the ability to enter feedback (e.g., selection of the feedback icon), the interactive user interface can transition to provide a feedback menu or other interface that enables entry of the feedback.

In some implementations, the systems of the present disclosure can determine that a vehicle failure event occurred based at least in part on vehicle data collected by the autonomous vehicle. For example, the vehicle data can be descriptive of vehicle conditions associated with the autonomous vehicle during an autonomous driving session. In some implementations, the vehicle data can include data collected by or otherwise received from various sensors included in the autonomous vehicle. As examples, the vehicle data can include data descriptive of a speed (also referred to as velocity) and/or data descriptive of a steering angle of the autonomous vehicle. As another example, additional vehicle data can be obtained or generated that is descriptive of a lateral acceleration of the autonomous vehicle. For example, in some implementations, lateral acceleration can be a function of the speed of the vehicle and the steering angle of the vehicle. Thus, in some implementations, lateral acceleration data can be generated from speed data and steering angle data.

As further examples, the vehicle data can include various types of data descriptive of vehicle conditions, including, for example: light detection and ranging (LIDAR) data; radio detection and ranging (RADAR) data; imagery collected by one or more cameras on-board the autonomous vehicle; accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data associated with the vehicle (e.g., collected or produced by sensors on-board the vehicle). As indicated above, the systems and methods of the present disclosure can perform vehicle failure event detection based on such vehicle data.

Example systems and methods that can be implemented or otherwise used by the present disclosure to detect vehicle failure events are described in U.S. patent application Ser. No. 15/469,981 filed Mar. 27, 2017 and titled "Machine Learning for Event Detection and Classification in Autonomous Vehicles." U.S. patent application Ser. No. 15/469,981 is hereby incorporated by reference in its entirety. Other techniques for automatic detection of vehicle failure events can be used in addition to the techniques described in U.S. patent application Ser. No. 15/469,981.

In some implementations, the systems of the present disclosure can determine that a vehicle failure event occurred based at least in part on data collected by the human machine interface computing device that describes motion experienced by the human within the autonomous vehicle. For example, the human machine interface device can include its own set of sensors such as, for example, accelerometers, inertial measurement units, gyroscopes, etc. The human machine interface device or other system device can analyze the sensor data generated by the sensors of the human machine interface device and can detect vehicle failure events based on such analysis (e.g., by applying the techniques described in U.S. patent application Ser. No. 15/469,981 to the data collected by the human machine interface computing device).

In some implementations, the systems of the present disclosure can determine that a vehicle failure event occurred based at least in part on data collected by the user computing device that describes motion experienced by the human within the autonomous vehicle. For example, the user computing device can include its own set of sensors such as, for example, accelerometers, inertial measurement units, gyroscopes, etc. The user computing device can transmit data generated by such sensors to the human machine interface device or other system/device of the autonomous vehicle. The human machine interface device or the other system/device can analyze the sensor data generated by the sensors of the user computing device and can detect vehicle failure events based on such analysis (e.g., by applying the techniques described in U.S. patent application Ser. No. 15/469,981 to the data collected by the user computing device).

According to another aspect, in response to detection of the occurrence of the vehicle failure event, the systems of the present disclosure can provide an interactive user interface. For example, the user interface can be displayed on a display portion of the human machine interface device (e.g., a front-seat display, handheld display, etc.), on a display of the user computing device, and/or in other manners or locations. The interactive user interface can enable a human located within the autonomous vehicle to enter feedback descriptive of the vehicle failure event. For example, a touch-sensitive display can receive human input via touch. Other input devices can be used as well such as, for example, a mouse, a keyboard or keypad, a touch pad, a click wheel, etc.

In some implementations, the user interface is not displayed on a display device, but instead may be, as one example, audio-based. For example, a speaker included in the autonomous vehicle may prompt the user to provide a voice response that includes feedback regarding the occurrence of the vehicle failure event at the autonomous vehicle. As another example, the user interface can be embodied in one or more physical buttons, knobs, sliders, levers; or the like which enable a user to provide feedback through manipulation of such physical components. As yet another example, feedback can be obtained through analysis of imagery captured by a camera. For example, computer vision techniques can be applied to imagery to assess or identify gestures, speech, eye movement, and/or facial expressions indicative of human comfort and/or satisfaction or other forms of feedback.

In some implementations, the user interface can include a plurality of nested hierarchical menus. For example, the nested hierarchical menus can guide the human to provide feedback that is descriptive of various aspects of the vehicle failure event in various levels of detail. The nested hierarchical menus can be designed to enable the human to quickly provide feedback in a form that is most useful for analysis (and correction) of the vehicle failure event.

In some implementations, the user interface can include a plurality of user-selectable icons that respectively correspond to a plurality of different types of vehicle failure events. The human can select one of the plurality of user-selectable icons to provide feedback indicative of the corresponding type of vehicle failure event. Example types of vehicle failure events include intersection failure events (e.g., turning failure events; stopping failure events; etc.); object failure events; zone issues failure events; non-behavior related failure events; straight line speed failure events; straight line position failure events; lane change failure events; and/or various other types of failure events. Many divisions or categories of vehicle failure events can be used in addition or alternatively to these example types.

In some implementations, following receipt of a user selection of one of the plurality of icons, the user interface can transition to provide a secondary menu that is associated with the selected type of vehicle failure event. The secondary menu can provide a second plurality of user-selectable icons that correspond to more detailed descriptions of the vehicle failure event of the selected type. As one example, if the human selects a first icon that corresponds to a straight line speed event, then the user interface can transition to provide a second plurality of icons that respectively correspond to more detailed descriptions of straight line speed failure events, such as, for example: too slow, too fast, harsh brake, harsh acceleration, stuck, creeping, etc. As a further example, selection of one of the second plurality of icons can result in transition of the user interface to a third menu that is specific to the selected icon, and so on. Any number of nested hierarchical menus can be used to enable feedback in a streamlined fashion. Any other aspects of the user interface (e.g., font, formatting, size, number of icons, type of icons, etc.) can be modified to provide interfaces that are specific to respective vehicle failure event(s).

In some implementations, the user interface can initially include a criticality menu that enables the human to indicate a criticality level of the vehicle failure event. For example, the human can indicate that the event was of zero criticality (e.g., should be ignored), low criticality (e.g., should be reviewed but not highly concerning), or high criticality (e.g., needs immediate attention). After receipt of a user selection that indicates the criticality level of the vehicle failure event, the user interface can then be transitioned to provide the plurality of user-selectable icons that respectively correspond to the plurality of different types of vehicle failure events or some other feedback menu. In some implementations, additional feedback menus are only provided if the human indicates a criticality above a certain level (e.g., if the zero criticality level is selected, then the interactive user interface does not request additional feedback).

In some implementations, the criticality menu or other feedback menu can enable the human to indicate that a particular type of event occurred that is under special investigation. Thus, an icon or other feature can enable "one-click" or "one-touch" reporting of the particular type of event for which additional information is specifically sought.

In some implementations, the interactive user interface can enable the human to input textual information (e.g., via a virtual keyboard or via speech recognition/dictation). Thus, an icon or other feature can enable the human to leave the predefined nested hierarchical menus and instead simply provide free-form textual feedback.

In some implementations, the interactive user interface can include a navigational portion. For example, the navigational portion can include one or more of navigational instructions and a map. In some implementations, the interactive user interface can maintain display of at least a portion of the navigational portion of the user interface when collecting human feedback descriptive of vehicle failure events. Thus, when enabling the human to provide feedback (e.g., by displaying a feedback menu), the user interface can still include and display navigational information.

In some implementations, at least a feedback portion of the interactive user interface can be auto-dismissed if human input is not received within a predetermined time frame. As one example, the interactive user interface can automatically prompt the human to provide feedback in response to detection of a vehicle failure event (e.g., by displaying a feedback portion that includes user-selectable icons). However, if the human does not provide input within some predefined period (e.g., 4 seconds), then the feedback portion can be automatically dismissed and the interactive user interface can return to a previous state (e.g., full screen navigation) or be turned off altogether. In some implementations, the user interface can include a visual timer that indicates the amount of time remaining until automatic dismissal of the feedback portion occurs.

In some implementations, the interactive user interface can include a visualization of the autonomous vehicle during occurrence of the detected vehicle failure event. As one example, the visualization can visualize or otherwise be generated based at least in part on light detection and ranging data collected by the autonomous vehicle contemporaneous to the occurrence of the vehicle failure event. Providing a visualization of the autonomous vehicle at the time of the detected vehicle failure event within the user interface can enable the human to visually review the vehicle failure event while providing the feedback.

In some implementations, the interactive user interface can request that the human provide feedback relative to multiple overlapping vehicle failure events (e.g., events that overlap in time). For example, the human can provide discrete feedback for each overlapping event or can provide feedback for the series of events as a whole.

In some implementations, after receiving the feedback, the systems of the present disclosure can associate the feedback with one or more of: a time at which the vehicle failure event occurred, a location at which the vehicle failure event occurred, and data collected by the autonomous vehicle during performance of the vehicle failure event. In some implementations, associating the feedback with one or more of such items can include storing the feedback in a database or other data representation where it is relationally associated with such one or more items. The feedback can be stored locally and then transferred to a central computing system as a batch offline and/or can be transmitted to the central computing system as soon as it is received by the vehicle from the human.

Collection and association of feedback in such fashion enables advanced recall and analysis of feedback based on time, location, vehicle failure event, vehicle data, other factors, or combinations thereof.

In particular, according to another aspect of the present disclosure, after collection of a significant amount of feedback using the techniques described above, the systems and methods of the present disclosure (e.g., a central computing system) can correlate and combine the feedback data to assess the general performance of a fleet of autonomous vehicles. The performance of the fleet of autonomous vehicles can be assessed according to different metrics and/or across different dimensions or combinations of dimensions. As one arbitrary example, all intersection vehicle failure events between 10 PM and 11 PM in the state of Pennsylvania can be analyzed. As another example, the performance of all vehicles at a single location or set of locations can be analyzed. As another example, an analysis of the aggregate feedback can result in identification of locations where vehicle failure events routinely occur. This can enable a development team to study and understand the particular factors (e.g., incorrect map data) that led to such consistent failure events at the location. Alternatively or additionally, locations at which aggregate feedback indicate significant amounts of failure events can be marked as off-limits for autonomous vehicles until the issue is resolved.

In yet another example aspect of the present disclosure, the systems and methods described herein can detect that a particular human located within an autonomous vehicle is visiting a location at which the human previously provided feedback descriptive of a vehicle failure event. In response, the systems and methods of the present disclosure can request the human provide new feedback. Receipt of additional feedback can enable an evaluation of whether any improvement in autonomous vehicle performance has been achieved in the time period between respective feedbacks, as indicated by a change in the feedback.

The systems and methods of the present disclosure provide a number of technical effects and benefits. For example, by prompting feedback in response to specific detected vehicle failure events, the systems and methods of the present disclosure enable correlation of time, location, and/or vehicle-collected data to certain vehicle failure events. Thus, as one technical benefit, the systems and methods of the present disclosure provide an improved vehicle performance analysis system that enables advanced and more granular detection and analysis of particular vehicle failure events. In addition, in some implementations, the feedback includes non-textual (e.g., numerical or categorical) descriptions of vehicle failure events and/or detailed textual descriptions of vehicle failure events. Thus, as another technical benefit, the systems and methods of the present disclosure provide an improved vehicle performance analysis system that enables large-scale collection of both textual and non-textual human perception information regarding autonomous driving behavior, which can be correlated to time, location, vehicle data, and/or any other available data dimensions.

As another technical benefit, the disclosure can improve the performance of computing hardware or other computing resources of the autonomous vehicle. For example, by prompting a human to log and/or provide feedback regarding vehicle failure event(s), limited computing and/or hardware resources of the autonomous vehicle are not required to be allocated to the task of characterizing failure events in real time. Thus, the processing power or other computing or hardware resources of autonomous vehicle can be allocated and utilized to perform other tasks (e.g., vehicle motion control) rather than vehicle failure event characterization, thereby improving the processing efficiency and performance of the autonomous vehicle. In particular, improved allocation of resources can allow the autonomous vehicle to provide more efficient, reliable, and accurate autonomous driving.

Moreover, in some implementations, the computing device(s) that perform failure event detection and feedback collection can be separate from the autonomy computing system that controls motion of the autonomous vehicle. As such, in such implementations, the autonomy computing system can include a simplified hardware architecture that is easier to upgrade, implement mode/redundancy checks, etc.

With reference now to the Figures, example embodiments of the present disclosure will be discussed in further detail.

Example Devices and Systems

FIG. 1 depicts a block diagram of an example computing system according to example embodiments of the present disclosure. The example computing system includes an autonomous vehicle 10, a central computing system 170, and a user computing device 175 that are communicatively coupled over one or more communication networks 180. The autonomous vehicle 10 can include one or more sensors 101, an autonomy computing system 102, one or more vehicle controls 107, and a human machine interface device 150. The sensors 101, autonomy computing system 102, and vehicle controls 107 will be discussed in further detail below with reference to FIG. 2.

The human machine interface device 150 can enable communication, control, and/or other interface actions to occur between the autonomous vehicle 10 and a human located within the autonomous vehicle 10. The human machine interface device 150 can be communicatively coupled to the autonomy computing system 102 to enable exchange of data, instructions, and/or requests between the system 102 and the device 150.

The human machine interface device 150 can include or be implemented by one or more computing devices that are operatively connected. The human machine interface device 150 can be an embedded computing device or a stand-alone computing device. In one particular example, the human machine interface device 150 can be a tablet computing device that is positioned within the autonomous vehicle 10 (e.g., within a front seat area of the autonomous vehicle 10).

The human machine interface device 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage media, such as RAM, ROM, EEPROM. EPROM, one or more memory devices, flash memory devices, etc., and combinations thereof.

The memory 154 can store information that can be accessed by the one or more processors 152. For instance, the memory 154 (e.g., one or more non-transitory computer-readable storage mediums, memory devices) can store data that can be obtained, received, accessed, written, manipulated, created, and/or stored. The memory 154 can also store computer-readable instructions that can be executed by the one or more processors 152. The instructions can be software written in any suitable programming language or can be implemented in hardware. Additionally, or alternatively, the instructions can be executed in logically and/or virtually separate threads on processor(s) 152. For example, the memory 154 can store instructions that when executed by the one or more processors 152 cause the one or more processors 152 to perform any of the operations and/or functions described herein.

According to an aspect of the present disclosure, the human machine interface device 150 can facilitate the prompting, collection, and/or entry of autonomous vehicle feedback. In particular, the human machine interface device 150 can utilize one or more interactive user interfaces to enable humans located with the autonomous vehicle to enter feedback.

In particular, according to an aspect of the present disclosure, the human machine interface device 150 and/or the autonomy computing system 102 can actively detect an occurrence of a vehicle failure event and, in response, prompt the human located within the autonomous vehicle to provide feedback regarding his/her subjective response to such vehicle failure event. In such fashion, feedback regarding specific instances and/or types of vehicle failure events can be collected, enabling more advanced and granular understanding and refinement of the autonomous vehicle technology relative to particular types of vehicle failure events and/or particular physical locations.

Figure 3:
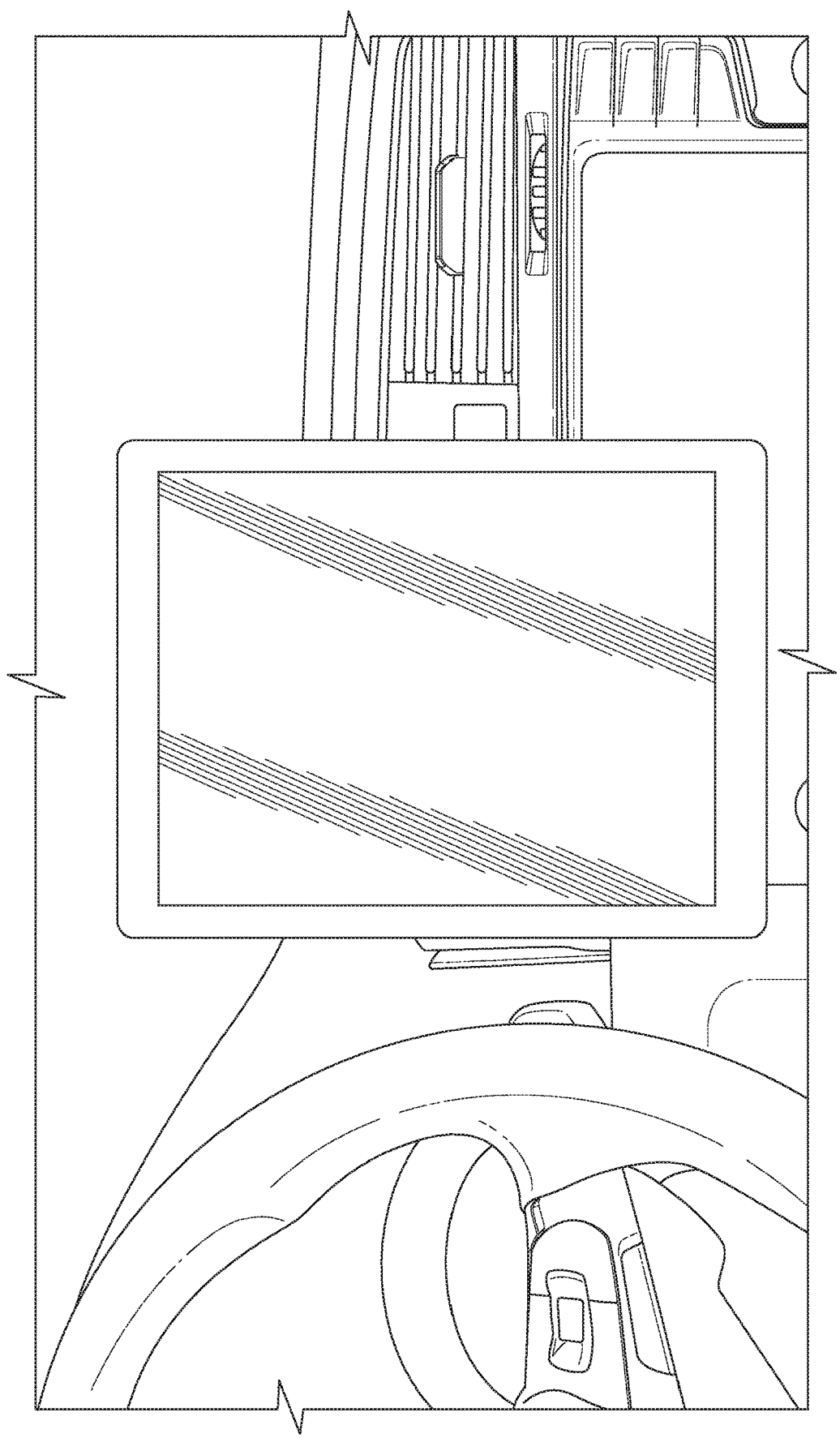
FIG. 3 depicts an example font-seat display device according to example embodiments of the present disclosure.

In some implementations, the human machine interface device 150 can include a display device 158 (e.g., a touch-sensitive display device) and/or other input/output components 160 that provide an interactive user interface (e.g., through which the human located within the autonomous vehicle can provide feedback). For example, the display device 158 can be a front-seat display device that is accessible by one or both of a passenger that is located in a front passenger seat of the autonomous vehicle and a driver that is located in a driver seat of the autonomous vehicle. As one example, FIG. 3 depicts an example front-seat display device according to example embodiments of the present disclosure.

Referring again to FIG. 1, in some implementations, in addition or alternatively to the human machine interface device 150, the systems and methods of the present disclosure can include or leverage a user computing device 175 that is associated with a human located within the autonomous vehicle. For example, in some implementations, in addition or alternatively to the display of the user interface by the human machine interface device 150, the interactive user interface can be provided on or accessible via a display of the user computing device 175. The user computing device 175 can be communicatively connected to the human machine interface device 150 via a local area network such as a short range wireless connection (e.g., a Bluetooth, ZigBee, NFC, infrared, etc.) or other forms of connections (e.g., hardwiring). As examples, the user computing device 175 can be a smartphone, tablet computing device, wearable computing device, portable gaming device, hand-held display screen, or other forms of computing devices.

In yet further implementations, certain operations described herein can be performed by a central computing system 170 that is remotely located to the autonomous vehicle 10 and in communication with the autonomous vehicle over one or more wireless networks 180 (e.g., cellular data networks, satellite communication networks, wide area networks, etc.). As an example, the central computing system 170 can include one or more server computing devices. In the event that plural server computing devices are used, the server computing devices can be arranged according to a parallel computing architecture, a sequential computing architecture, or combinations thereof. In some implementations, the central computing system 170 can provide control, monitoring, management, and/or other functionality for a fleet of autonomous vehicles 10.

According to an aspect of the present disclosure, the computing system illustrated in FIG. 1 can detect an occurrence of a vehicle failure event at the autonomous vehicle 10. For example, the human machine interface device 150, the autonomy computing system 102, and/or other communicatively coupled devices or systems (e.g., central computing system 170) can include an event detector 156 that continuously, near-continuously, or periodically assesses available data (e.g., received from sensors 101 and/or autonomy computing system 102) to detect the occurrence of a vehicle failure event at the autonomous vehicle 10. In the example system of FIG. 1, the event detector 156 is illustrated as being included within or otherwise implemented by the human machine interface device 150. However, as noted, the event detector 156 can alternatively be included in or otherwise implemented by other devices or components, including, for example, the autonomy computing system 102.

Example types of vehicle failure events include intersection failure events (e.g., turning failure events, stopping failure events, etc.); object failure events; zone issues failure events; non-behavior related failure events; straight line speed failure events; straight line position failure events; lane change failure events; and/or other events that reduce the quality of ride experienced by a human passenger of the autonomous vehicle (e.g., cause the ride to be uncomfortable to a human).

In some implementations, the event detector 156 can detect an occurrence of a vehicle failure event based at least in part on data indicative of a human intervention event in which a human driver assumed control of the autonomous vehicle 10. For example, the intervention may have been required or optional. According to an aspect of the present disclosure, upon detection of such a human intervention event, an interactive user interface can automatically be provided that prompts the human to provide feedback. Thus, human feedback can be actively prompted whenever a human intervention event occurs, resulting in increased collection of human feedback descriptive of specific instances in which human intervention was required or otherwise performed.

In some implementations, the event detector 156 can determine that a vehicle failure event occurred based at least in part on a human input from the human that requests the ability to enter the feedback. For example, the human machine interface device 150 can continuously, display the user interface during operation. The user interface can include a feedback icon that, when selected by the human, indicates the human would like to enter feedback information. Thus, selection of the feedback icon by the human can indicate that a vehicle failure event occurred. In response to human input that requests the ability to enter feedback (e.g., selection of the feedback icon), the interactive user interface can transition to provide a feedback menu or other interface that enables entry of the feedback.

In some implementations, the event detector 156 can detect an occurrence of a vehicle failure event based at least in part on vehicle data collected by the autonomous vehicle 10. For example, the vehicle data can be descriptive of vehicle conditions associated with the autonomous vehicle 10 during an autonomous driving session. In some implementations, the vehicle data can include data collected by or otherwise received from various sensors 101 included in the autonomous vehicle 10. As examples, the vehicle data can include data descriptive of a speed (also referred to as velocity) and/or data descriptive of a steeling angle of the autonomous vehicle 10. As another example, additional vehicle data can be obtained or generated that is descriptive of a lateral acceleration of the autonomous vehicle 10. For example, in some implementations, lateral acceleration can be a function of the speed of the vehicle and the steering angle of the vehicle. Thus, in some implementations, lateral acceleration data can be generated from speed data and steering angle data.

As further examples, the vehicle data can include various types of data descriptive of vehicle conditions, including, for example: light detection and ranging (LIDAR) data; radio detection and ranging (RADAR) data; imagery collected by one or more cameras on-board the autonomous vehicle; accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data associated with the vehicle 10 (e.g., collected or produced by sensors 101 on-board the vehicle). As indicated above, the event detector 156 can perform vehicle failure event detection based on such vehicle data.

In some implementations, the event detector 156 can detect an occurrence of a vehicle failure event based at least in part on telematics data generated by the autonomous vehicle 10. For example, telematics data can include any type of data (e.g., navigational data such as vehicle location, vehicle data, etc.) generated by the autonomous vehicle 10 and transmitted to the central computing system 170. In some implementations, the central computing system 170 can detect a vehicle failure event based on received telematics data and, thereafter, can notify the human machine interface device 150 or user computing device 175 to provide the interactive user interface in response to the detected vehicle failure event. Alternatively, a computing system or device included on-board the autonomous vehicle (e.g., the human machine interface device 150) can analyze the telematics data to detect vehicle failure event(s).

In some implementations, the event detector 156 can detect an occurrence of a vehicle failure event based at least in part on data collected by the human machine interface computing device 150 that describes motion experienced by the human located within the autonomous vehicle. For example, the human machine interface device 150 can include its own set of sensors 162 such as, for example, accelerometers, inertial measurement units, gyroscopes, etc. The event detector 156 can analyze the sensor data generated by the sensors 162 of the human machine interface device 150 and can detect vehicle failure events based on such analysis.

In some implementations, the event detector 156 can detect an occurrence of a vehicle failure event based at least in part on data collected by the user computing device 175 that describes motion experienced by the human located within the autonomous vehicle. For example, the user computing device 175 can include its own set of sensors such as, for example, accelerometers, inertial measurement units, gyroscopes, etc. The user computing device 175 can transmit data generated by such sensors to the human machine interface device 150 or other system/device of the autonomous vehicle 10. The event detector 156 can analyze the sensor data generated by the sensors of the user computing device 175 and can detect vehicle failure events based on such analysis.

As one example of how the event detector 156 can operate, in some implementations of the present disclosure, the event detector 156 can include or otherwise leverage one or more machine learned classifier models that can perform event detection on the basis of various features extracted from the above described forms of data, such as, for example, vehicle data, telematics data, user device sensor data, human machine interface device sensor data, etc. For example, the features can be extracted by performing a continuous wavelet transform or other feature extraction technique on the vehicle data or other forms of data described above.

Existing data logs that include event labels recorded by a human can be used to train the machine learned classifier model. For example, the classifier model can be trained using an objective function that describes a difference between predictions made by the classifier model on the existing data log and the event labels associated with the data log.

In some implementations, the event detector 156 can obtain the vehicle data or other forms of data described above. The event detector 156 can include a data preprocessor that preprocesses the data to prepare it for event analysis. As an example, in some implementations, the data preprocessor can process the raw data raw sensor data) to determine a state of the vehicle at a given time. For example, the state of the vehicle at a given time can include information describing one or more of the following parameters for the vehicle: timestamp; speed; steering angle; longitudinal acceleration; geographic location; and/or other parameters. In some implementations, preprocessing the data can include applying one or more filters to the data. For example, the applied filters can include an average filter, a median filter, and/or a low pass filter. Applying filters in such fashion can smooth the data to reduce noise. In some implementations, the data can be preprocessed by the autonomous vehicle in real-time prior to storage in a data log. In some implementations, the data is not preprocessed.

According to another aspect of the present disclosure, the event detector 156 can include a feature extractor that extracts a plurality of features from the data (e.g., the preprocessed data). In some implementations, the feature extractor can perform even sampling on the data by sampling the data at evenly spaced time points. In other implementations, sampling of the data may be unevenly spaced. In yet further implementations, the feature extractor can continuously or near-continuously sample the data. In some implementations, each sample of the data can include a window of data around a particular sampling time.

Regardless, for each instance of sampling of the data, the feature extractor can extract one or more features from the data. As examples, the extracted features can include speed feature(s), steering angle feature(s), lateral acceleration feature(s), or other types of features. Generally, the features can be of any type that is useful for detecting and classifying events.

In particular, in some implementations, the feature extractor can perform a feature extraction technique on the data to extract the plurality of features. Example feature extraction techniques that can be performed include the continuous wavelet transform technique, the short-term Fourier transform, and/or other time-frequency analysis techniques. When performing the continuous wavelet transform technique, one or more of various wavelets can be used including, as examples: the Haar wavelet; the Daubechies wavelets; the Biorthogonal wavelets; the BD wavelet; the Coiflets wavelets; the Symlets wavelets; the Morlet wavelet; the Mexican Hat wavelet; the Meyer wavelet; and/or other wavelets. In particular, performing continuous wavelet transform with the Mexican Hat wavelet and/or the BD wavelet can be particularly beneficial for extracting features useful for detection of events of high acceleration, high deceleration, and/or juke.

Thus, as an example, the feature extractor can sample the data (e.g., speed data, steering angle data, lateral acceleration data, and/or other vehicle data channels or representations) and perform continuous wavelet transform (or other feature extraction techniques) on each channel of the sampled data. In particular, in some implementations, performing continuous wavelet transform (or other feature extraction techniques) on the sampled data can include determining a plurality of scale components for each channel of data. For example, a selected wavelet (e.g., the Mexican Hat wavelet) can be scaled according to a number of scale values. For example, in some implementations, approximately one hundred scale values can be used. Thus, to provide a particular example for the purpose of illustration, the feature extractor can perform continuous wavelet transform on sampled speed data at one hundred scale values of the Mexican Hat wavelet, which can result in one hundred scale components for the speed data per instance of sampling. In some implementations, the scale components can directly be used as features for detecting and classifying events.

In addition, in some implementations, the feature extractor can compute, for each channel of data, a set of statistics that describe the plurality of scale components for each sample of such channel of data. As examples, the computed statistics for each channel of data can include one or more of: a mean of the plurality of scale components, a standard deviation of the plurality of scale components, a maximum of the plurality of scale components, a minimum of the plurality of scale components, and a moment of the plurality of scale components. For example, a moment of a scale component can correspond to the scale value multiplied by the magnitude of such scale component or, in other terms, can correspond to the frequency multiplied by the wavelet amplitude. Thus, to continue the particular example provided above, the feature extractor can compute a set of statistics for the one hundred scale components for the speed data per instance of sampling. In addition, in some implementations, statistics can be computed over an extended time window (e.g., one minute) for use in jumpy detection. In some implementations, the computed statistics can be used as features for detecting and classifying events in addition or alternatively to use of the scale components directly as features.

In some implementations, the features extracted for each time sample of the data (e.g., scale components and/or statistics for scale components) can be input into the classifier model included in the event detector 156 to receive a classification for such sample of data. For example, the classifier can receive the features extracted from some or all of the data channels for a given time sample and, in response, provide a classification based on the received features for such time sample. The classification can be a binary classification or a multinomial classification.

In other implementations, the event detector 156 can include a candidate event detector that analyzes the features extracted for each time sample of the data and identifies whether such time sample includes one or more candidate events. Thus, in some implementations, only features that have been identified as corresponding to one or more candidate events are input into the classifier model, which may, in some instances, enhance system efficiency.

In some implementations, the candidate event detector can identify candidate events based on the extracted features. For example, in some implementations, the candidate event detector can identify one or more relative peaks associated with the plurality of scale components determined for a particular data channel. As one example, a relative peak can be identified at each instance in which the absolute value of a scale component is greater than the mean of the absolute value of such scale component. Each identified peak can be regarded as or otherwise correspond to a candidate event.

As described above, the features extracted for a particular time sample of the data (e.g., a time sample identified as corresponding to one or more candidate events) can be input into the classifier model to receive a classification for such sample of data (e.g., for each identified candidate event). For example, the classifier can receive the features extracted from some or all of the data channels for a given time sample and, in response, provide a classification based on the received features for such time sample or corresponding candidate event(s). In some implementations, data can also be provided as inputs to the classifier model in addition to the extracted features. The classification can be a binary classification (e.g., identify a single classification) or a multinomial classification (e.g., provide a relative score or probability for each available classification). Example event classifications include: a high deceleration classification, a high acceleration classification, a juke classification, a jerk classification, a weaving classification, a "no event" classification, an "other" classification, and/or any example event types described herein, and/or any other types of classification that are desired to be detected. In some implementations, the classifier model can further perform jumpy detection in which a large number of events within a time window (e.g., one minute) are detected.

As examples, the classifier model can be or include one or more machine-learned models such as, for example, a logistic regression classifier, a support vector machine, one or more decision trees, a neural network, and/or other types of models including both linear and non-linear models. Neural networks can include deep neural networks, feed-forward neural networks, recurrent neural networks (e.g., long short-term memory recurrent neural networks), convolutional neural networks, or combinations thereof.

According to another aspect of the present disclosure, existing data logs that include event labels recorded by a human passenger can be used to train the classifier model. In particular, a human co-pilot or passenger can ride in an autonomous vehicle and make a record of when particular events occur. At the same time, the autonomous vehicle can record or otherwise store its collected data. The humanly-generated events records can be attached to the data collected by the autonomous vehicle at such time. Thus, use of a human passenger to provide manual labels can result in a corpus of data logs that include event labels that are generally aligned in time with data that reflects such events. According to an aspect of the present disclosure, such corpus of data logs with event labels can be used to train the classifier model.

However, using a human passenger to create and complete event records can, in some instances, cause a delay between when the event occurred and when the record was created, thereby leading to at least some of the event records having a slight delay in their timestamp relative to when the event occurred. To remedy this issue, in some implementations, the systems of the present disclosure can apply or re-apply each event label to any potentially referenced events that occurred within some time window prior to the timestamp of such event label. Thus, for each event label included in the data log, the computing system can identify a plurality of potentially referenced events within a time window prior to the particular time associated with the event label and associate the event label with each of the plurality of potentially referenced events. To provide an example, for a particular high acceleration event label, all potential events of high acceleration (e.g., instances in which acceleration is greater than a threshold value) within a sixty second window prior to the event label can be labeled as positives for high acceleration events. In other implementations, candidate events within the time window can be identified as described above (e.g., through identification of relative peaks in scale components), and the event label can be applied to each of such candidate events. Other techniques can be used to apply the manual event labels to their corresponding features as well.

In some implementations, to generate the training data from the data logs and manual labels, the systems and methods of the present disclosure can extract, for each time at which an event label has been applied to the data, one or more features from the data log. For example, the feature extraction process described above can be applied at each instance in which a label has been applied to the data. The event label can then be associated with the one or more features extracted from the data log for the corresponding time or vice versa. Thus, as a result, a training set can be generated that includes a plurality of sets of features, where each set of features is labeled with a particular event label (e.g., "high acceleration").

The classification model can be trained using such training data. In particular, in some implementations, a training computing system can, for each pair of extracted features and corresponding event label, input the extracted features into the classifier model; receive at least one classification as an output of the classifier model; and evaluate an objective function that describes a difference between the at least one classification and the event label that corresponds to the input features. The training system can train the classifier model based at least in part on the objective function. As one example, in some implementations, the objective function can be backpropagated through the classifier model to train the classifier model. In such fashion, the classifier model can be trained to provide a correct event classification based on the receipt of features extracted from data.

The event detector 156 can include computer logic utilized to provide desired functionality. In some implementations, the event detector 156 can be implemented in hardware, firmware, and/or software controlling a general purpose processor. For example, in some implementations, the event detector 156 includes program files stored on a storage device, loaded into a memory and executed by one or more processors. In other implementations, the event detector 156 includes one or more sets of computer-executable instructions that are stored in a tangible computer-readable storage medium such as RAM hard disk or optical or magnetic media.

According to another aspect of the present disclosure, in response to detection of the occurrence of the vehicle failure event by the event detector 156, the computing system illustrated in FIG. 1 can provide an interactive user interface. For example, the user interface can be displayed on a display portion 158 of the human machine interface device 150 (e.g., a front-seat display, handheld display, etc.), on a display of the user computing device 175, or in other manners or locations. The interactive user interface can enable a human located within the autonomous vehicle of the autonomous vehicle 10 to enter feedback regarding the occurrence of the vehicle failure event at the autonomous vehicle 10. For example, a touch-sensitive display can receive human input via touch. Other input components 160 can be used as well such as, for example, a mouse, a keyboard or keypad, a touch pad, a click wheel, keyboard, etc.

In some implementations, the user interface is not displayed on a display device (e.g., display 158), but instead may be, as one example, audio-based. For example, a speaker included in the human machine interface device 150 or other system component may prompt the user to provide a voice response that includes feedback regarding the occurrence of the vehicle failure event at the autonomous vehicle. For example, a personal assistant or other artificial intelligence-based technology can interact with the human located within the autonomous vehicle via voice conversation to obtain feedback.

As another example, the user interface can be embodied in one or more physical buttons, knobs, sliders, levers, or other user input components 160 which enable a user to provide feedback through manipulation of such physical components.

As yet another example, feedback can be obtained through analysis of imagery captured by a camera. For example, computer vision techniques can be applied to imagery to assess or identify gestures, speech, eye movement, and/or facial expressions indicative of human comfort and/or satisfaction (e.g., thumbs up versus thumbs down). Predefined gestures can also be used to provide more specific feedback.

In some implementations, after receiving the feedback, the human machine interface device 150 or other system component can associate the feedback with one or more of: a time at which the vehicle failure event occurred, a location at which the vehicle failure event occurred, and data collected by the autonomous vehicle 10 contemporaneous to the vehicle failure event. In some implementations, associating the feedback with one or more of such items can include storing the feedback in a database or other data representation where it is relationally associated with such one or more items. The feedback can be stored locally (e.g., by memory 154) and then transferred to the central computing system 170 as a batch offline and/or can be transmitted to the central computing system 170 as soon as it is received by the vehicle 10 from the human located within the autonomous vehicle.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
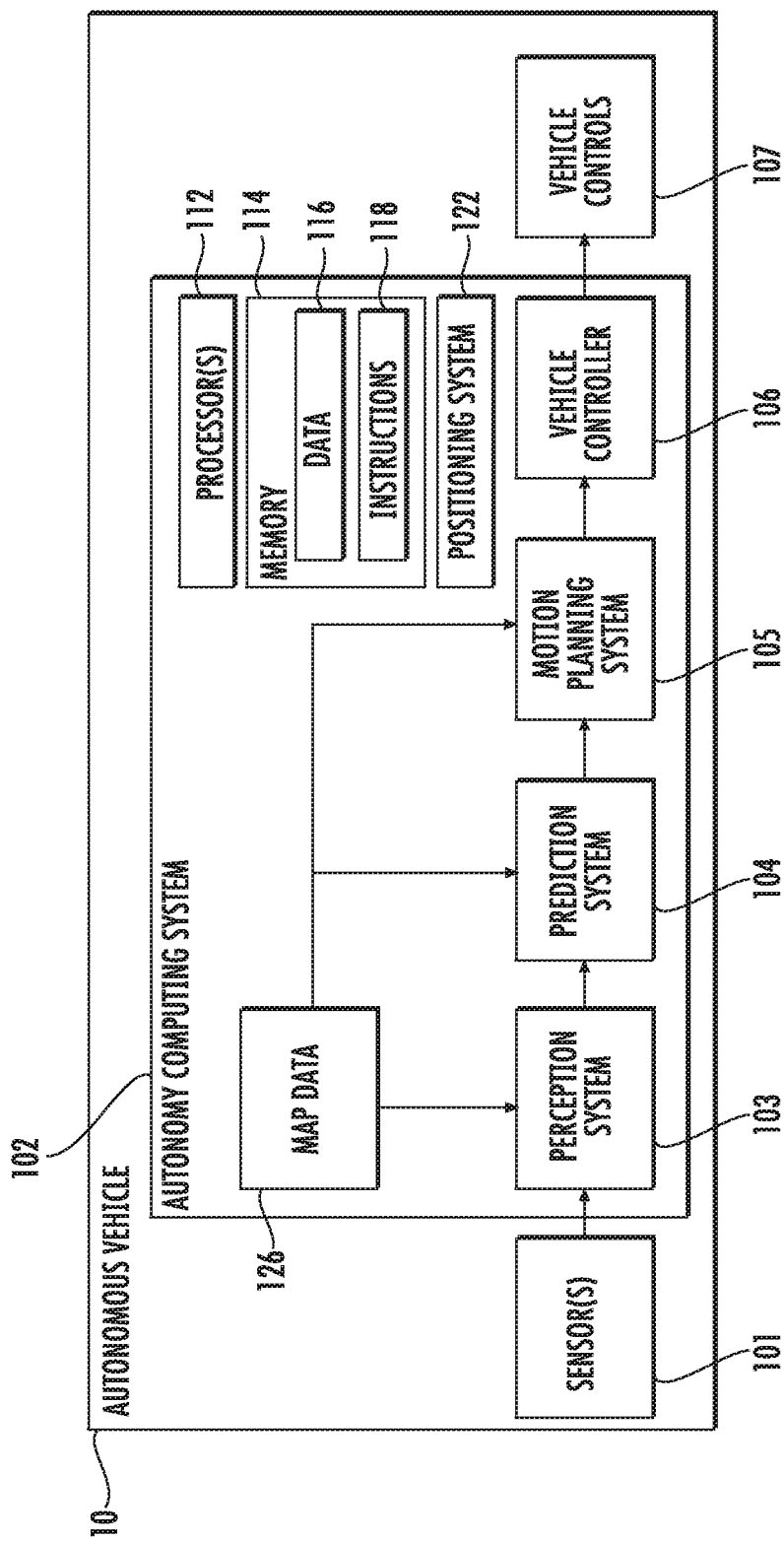
FIG. 2 depicts a block diagram of an example autonomous vehicle according to example embodiments of the present disclosure.

FIG. 2 depicts a block diagram of the example autonomous vehicle 10 in further detail according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, the autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion path through such surrounding environment. The autonomy computing system 102 can control the one or more vehicle controls 107 to operate the autonomous vehicle 10 according to the motion path.

The autonomy computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware, Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

In some implementations, autonomy computing system 102 can further include a positioning system 122. The positioning system 122 can determine a current position of the vehicle 10. The positioning system 122 can be any device or circuitry for analyzing the position of the vehicle 10. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

As illustrated in FIG. 2, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

As one example, in some implementations, the motion planning system 105 can evaluate a cost function for each of one or more candidate motion plans for the autonomous vehicle 10 based at least in part on the current locations and/or predicted future locations of the objects. For example, the cost function can provide a cost (e.g., over time) of adhering to a particular candidate motion plan. For example, the cost provided by a cost function can increase when the autonomous vehicle 10 strikes another object and/or deviates from a preferred pathway (e.g., a preapproved pathway).

Thus, given information about the current locations and/or predicted future locations of objects, the motion planning system 105 can determine a cost of adhering to a particular candidate pathway. The motion planning system 105 can select or determine a motion plan for the autonomous vehicle 10 based at least in part on the cost function(s). For example, the motion plan that minimizes the cost function can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Example User Interfaces

According to another aspect of the present disclosure, in response to detection of the occurrence of a vehicle failure event at the autonomous vehicle, the systems of the present disclosure can provide an interactive user interface. The interactive user interface can enable a human located within the autonomous vehicle to enter feedback regarding the occurrence of the vehicle failure event.

In some implementations, the user interfaces described herein can include a plurality of nested hierarchical menus. For example, the nested hierarchical menus can guide the human to provide feedback that is descriptive of various aspects of the vehicle failure event in various levels of detail and/or along various dimensions of description. The nested hierarchical menus can be designed to enable the human to quickly provide feedback in a form that is most useful for analysis of the vehicle failure event.

FIGS. 4-7 depict example user interfaces according to example embodiments of the present disclosure. The user interfaces shown in FIGS. 4-7 are provided as examples only. Different user interfaces with different features, arrangements, or interactivity can be used in addition or alternatively to the user interfaces shown in FIGS. 4-7.

Figure 4:
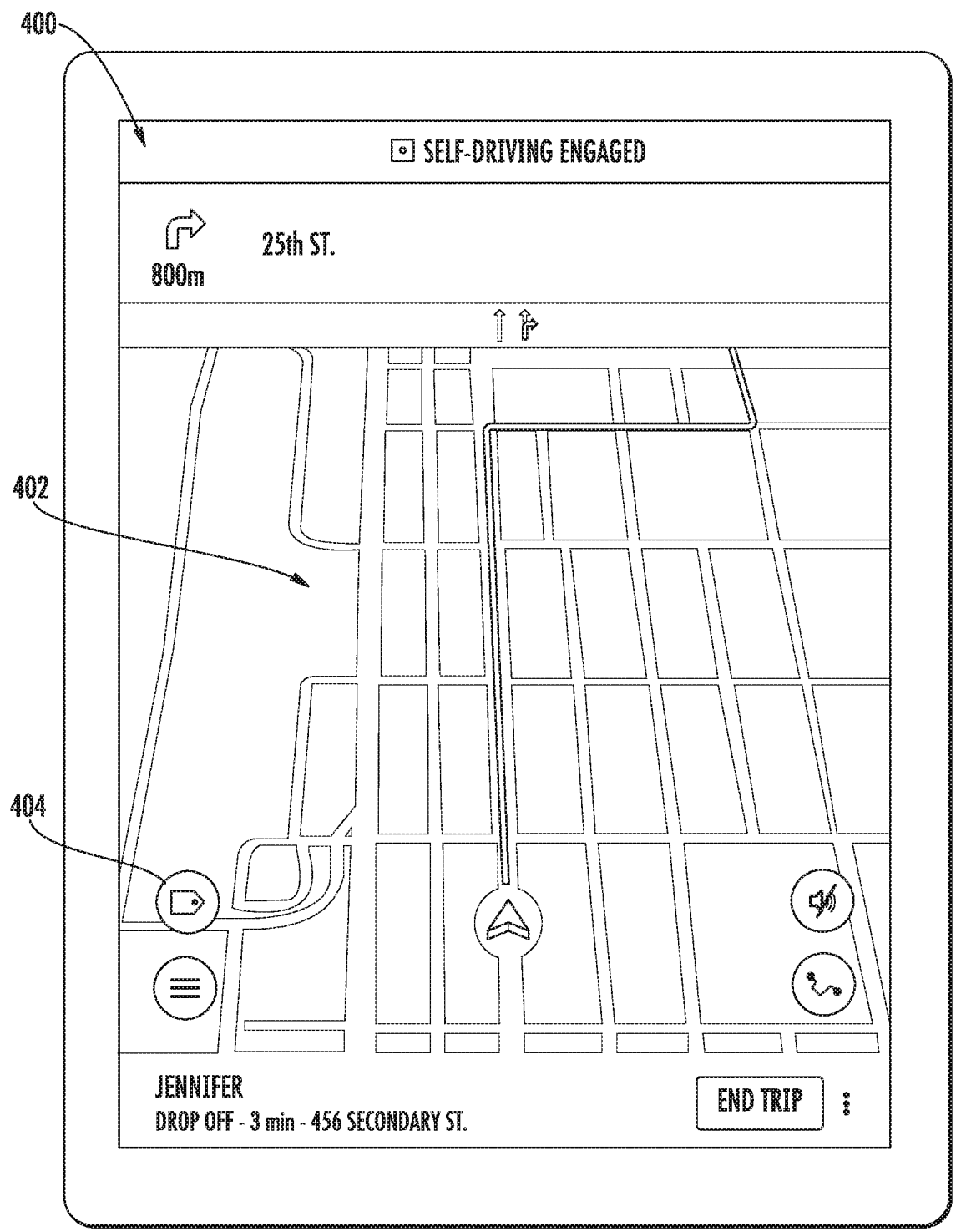
FIG. 4 depicts an example interactive user interface according to example embodiments of the present disclosure.

FIG. 4 depicts an example interactive user interface 400 according to example embodiments of the present disclosure. In particular, in some implementations, the user interface 400 can be provided during normal operation of the vehicle in an autonomous driving mode.

The user interface 400 can include a navigational portion 402. For example, the navigational portion 402 can include navigational instructions, a map, and/or other navigational information.

According to an aspect of the present disclosure, the user interface 400 can include a feedback icon 404 that, when selected by the human, indicates the human would like to enter feedback information. Thus, selection of the feedback icon 404 by the human can indicate that a vehicle failure event occurred. In response to selection of the feedback icon 404, the interactive user interface 400 can transition to provide a feedback menu or other interface that enables entry of feedback by the human.

Thus, a failure event feedback menu may be always manually accessible via selection of the feedback icon 404. In some implementations, in addition or alternatively to selection of the feedback icon 404, the feedback menu may be manually accessible via one or more swipe operations (e.g., swipe up from bottom of interface) or other control actions.

In addition to manual access or entry to the failure event feedback menu, the systems and methods of the present disclosure can automatically transition from the user interface 400 to the feedback menu when a vehicle failure event is detected. For example, the user interface 400 can be automatically transitioned to provide a feedback menu in response to instances in which a human operator was required to or chose to intervene and assume manual control of the autonomous vehicle. Thus, feedback can be manually accessed and/or automatically prompted in response to vehicle failure events.

Figure 5:
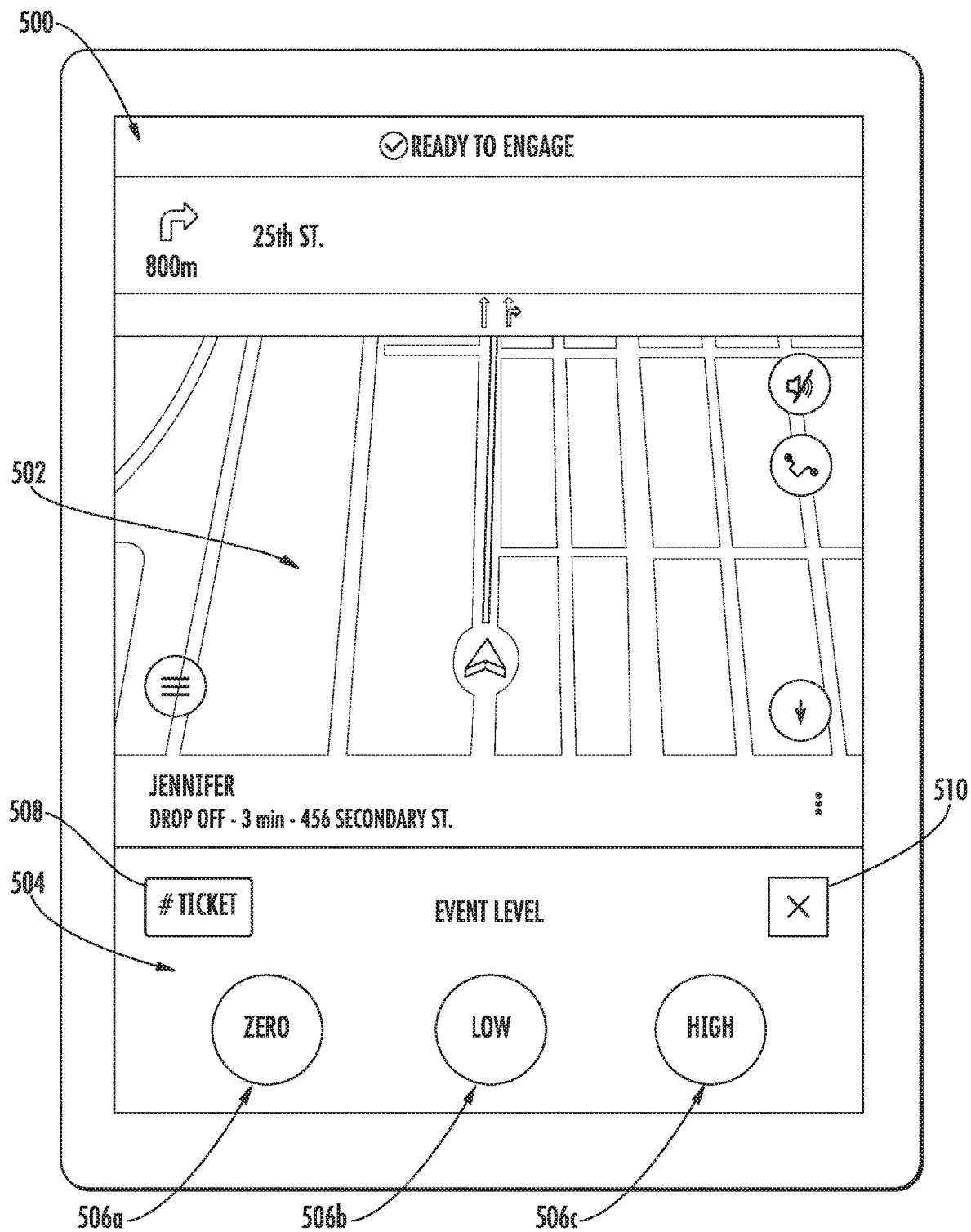
FIG. 5 depicts an example interactive user interface according to example embodiments of the present disclosure.

FIG. 5 depicts an example interactive user interface 500 that includes a feedback menu according to example embodiments of the present disclosure. In particular, the user interface 500 includes a criticality menu 504 that enables the human to indicate a criticality level of the vehicle failure event. For example, the human can indicate that the event was of zero criticality (e.g., should be ignored) by selecting icon 506a; that the event was of low criticality (e.g., should be reviewed but not highly concerning) by selecting icon 506b; or that the event was of high criticality (e.g., needs immediate attention) by selecting icon 506c. Many other and different divisions of criticality can be provided by the criticality menu 504.

The user interface 500 can also include a ticket button 508. Selection of the ticket button 508 can enable the human to input textual information. For example, in response to selection of the ticket button 508, the user interface 500 can be modified to include a virtual keyboard or other feature that enables entry of textual information. Thus, the ticket button 508 can enable the human to leave the predefined menu structure (e.g., the criticality menu 504 or other structured menus described herein) and instead simply provide free-form textual feedback.

In some implementations, the criticality menu 504 or other feedback menus described herein can enable the human to indicate the occurrence of a particular type of event that is under special investigation. Thus, an icon (not specifically illustrated in FIG. 5) or other feature can enable "one-click" or "one-touch" reporting of the particular type of event for which additional information is specifically sought.

The user interface 500 can further include a dismiss icon 510. Selection of the dismiss icon 510 can result in dismissal or removal of the feedback menu (e.g., the criticality, menu 504). For example, selection of the dismiss icon 510 can result in transition of the user interface back to the standard operating user interface (e.g., the example user interface 400 of FIG. 4).

In some implementations, at least a feedback portion of the interactive user interface (e.g., the criticality menu 504 or other feedback menus described herein) can be auto-dismissed if human input is not received within a predetermined time frame. As one example, the interactive user interface can automatically prompt the human to provide feedback in response to detection of a vehicle failure event (e.g., by displaying a feedback portion that includes user-selectable icons). However, if the human does not provide input within some predefined period (e.g., 4 seconds), then the feedback portion can be automatically dismissed and the interactive user interface can return to a previous state (e.g., full screen navigation) or be turned off altogether.

In some implementations, the user interface can include a visual timer that indicates the amount of time remaining until automatic dismissal of the feedback portion occurs. For example, the visual timer can be a progress bar (e.g., located above the dismiss icon 510) that fills (e.g., from left to right) to indicate the time remaining until dismissal.

In some implementations, at least some of the navigational portion 502 can remain within the user interface when the feedback menu the criticality menu 504) is provided in the user interface 500.

In some implementations, the icons 506a-c are textual in nature. In other implementations, the icons 506a-c are not textual in nature but instead include a graphical depiction. In some implementations, the icons 506a-c include both textual and graphical descriptions.

Any other aspects of the user interface 500 (e.g., font, formatting, size, number of icons, type of icons, etc.) can be modified to provide interfaces that are specific to respective vehicle failure event(s).

Referring still to FIG. 5, after receipt of a user selection that indicates the criticality level of the vehicle failure event (e.g., a user selection of one of the icons 506a-c), the user interface can then be transitioned to provide a different feedback menu that enables entry of different information descriptive of the vehicle failure event. In some implementations, additional feedback menus are only provided if the human indicates a criticality above a certain level (e.g., if the zero criticality level is selected, then the interactive user interface does not request additional feedback).

Figure 6:
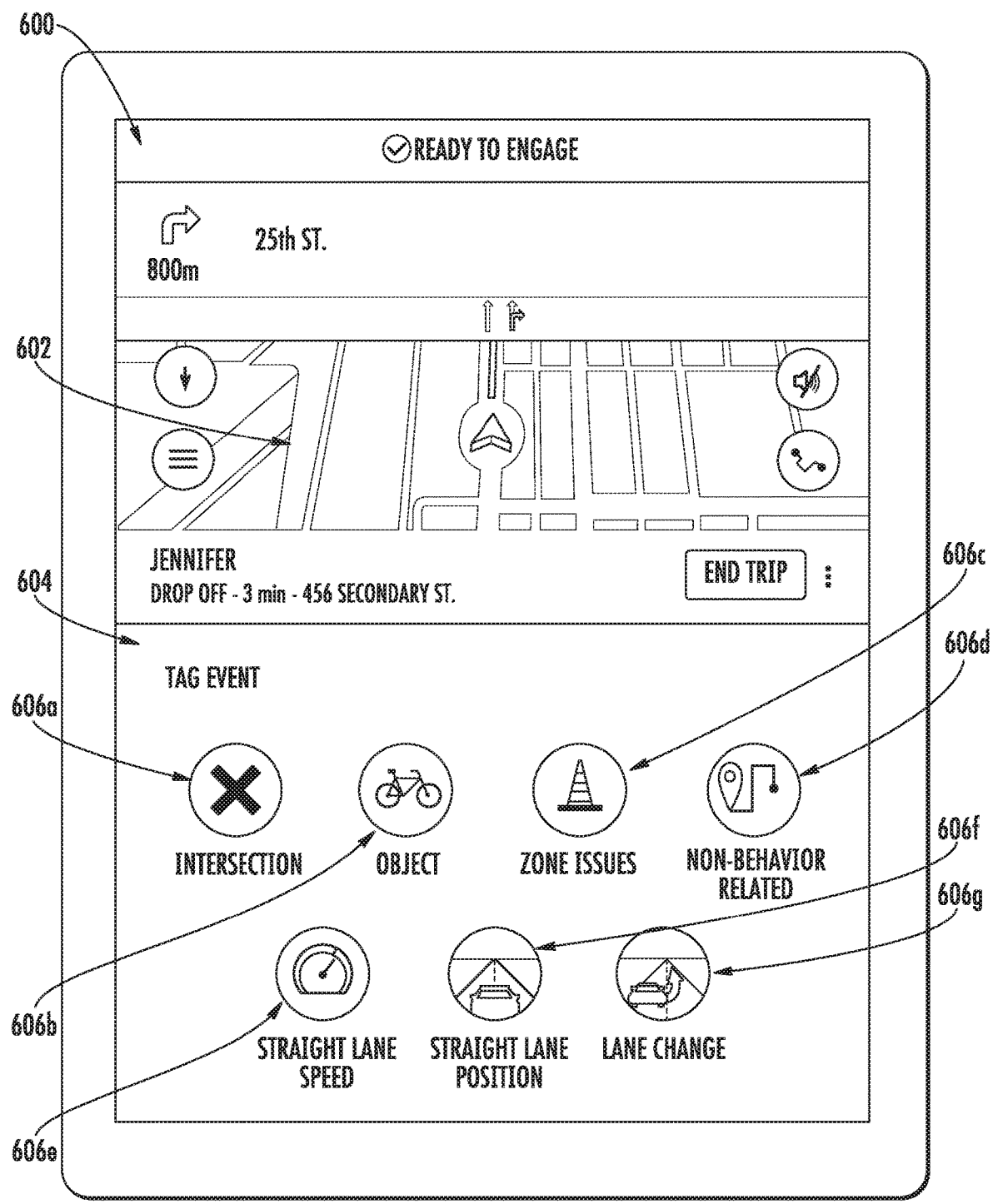
FIG. 6 depicts an example interactive user interface according to example embodiments of the present disclosure.

As one example, FIG. 6 depicts an example user interface 600 that includes a feedback menu according to example embodiments of the present disclosure. In some implementations, the user interface 600 can be transitioned to or otherwise provided in response to selection of a criticality level from the criticality menu 504 of FIG. 5. However, in other implementations, the user interface 600 may be provided directly in response to detection of a vehicle failure event (e.g., without providing the criticality menu).

The user interface 600 includes an event type menu 604 that includes a plurality of user-selectable icons 606a-g that respectively correspond to the plurality of different types of vehicle failure events. The human can select one of the plurality of user-selectable icons 606a-g to provide feedback indicative of the corresponding type of vehicle failure event. Example types of vehicle failure events include intersection failure events (e.g., turning failure events, stopping failure events; etc.); object failure events; zone issues failure events; non-behavior related failure events; straight line speed failure events; straight line position failure events; lane change failure events; and/or various other types of failure events. Many divisions or categories of vehicle failure events can be used in addition or alternatively to these example types.

In some implementations, at least some of the navigational portion 602 can remain within the user interface when the feedback menu (e.g., the event type menu 604) is provided in the user interface 600.

In some implementations, the icons 606a-g are textual in nature. In other implementations, the icons 606a-g are not textual in nature but instead include a graphical depiction. In some implementations, as illustrated in FIG. 6, the icons 606a-g include both textual and graphical descriptions.

Any other aspects of the user interface 600 (e.g., font, formatting, size, number of icons, type of icons, etc.) can be modified to provide interfaces that are specific to respective vehicle failure event(s).

Referring still to FIG. 6. In some implementations, following receipt of a user selection of one of the plurality of icons 606a-g, the user interface 600 can transition to provide a secondary menu that is associated with the selected type of vehicle failure event.

Figure 7:
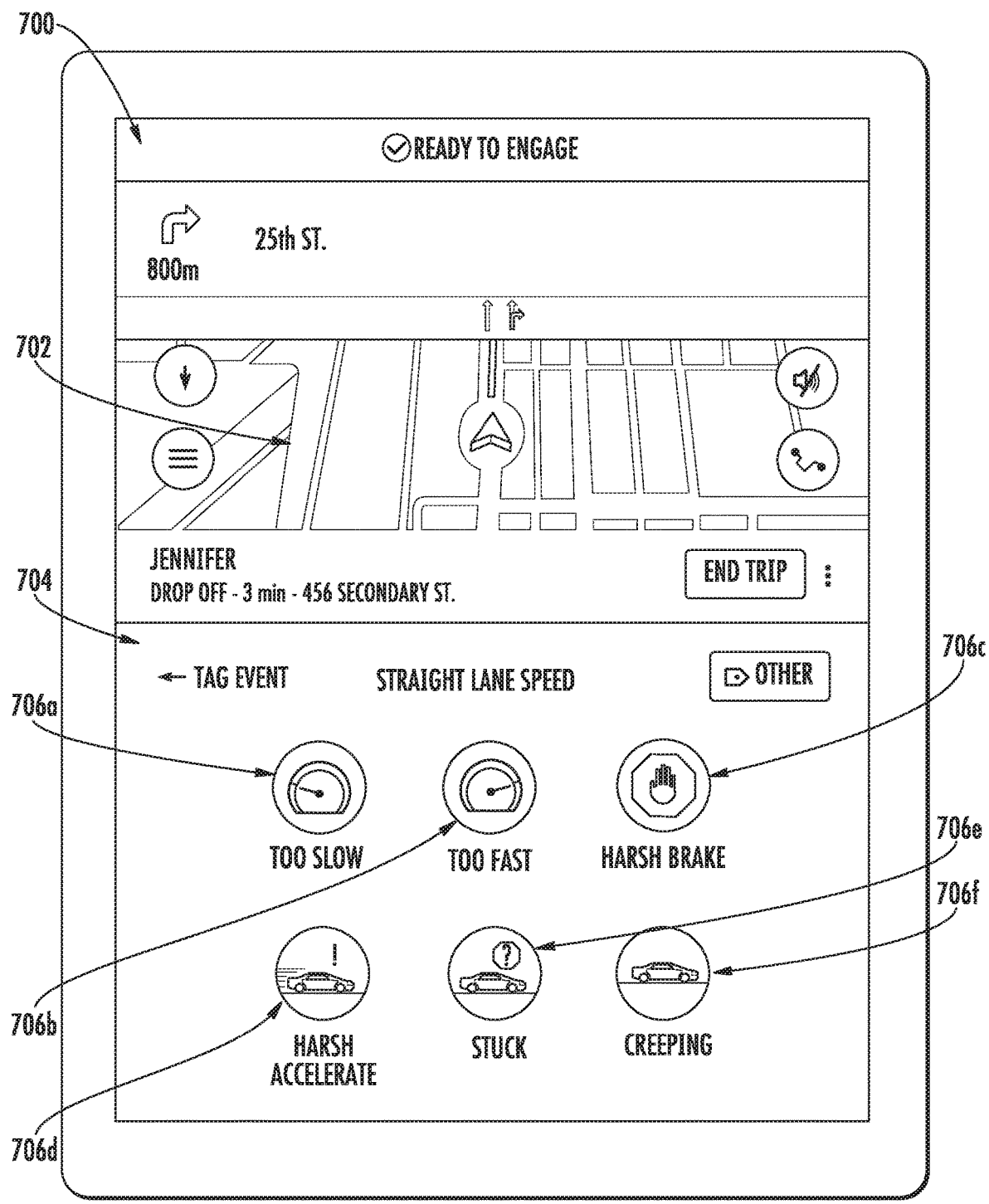
FIG. 7 depicts an example interactive user interface according to example embodiments of the present disclosure.

As an example, FIG. 7 depicts an example user interface 600 that includes a feedback menu according to example embodiments of the present disclosure. In some implementations, the user interface 700 can be transitioned to or otherwise provided in response to selection of an event type from the event type menu 604 of FIG. 6. However, in other implementations, the user interface 700 can be provided directly in response to detection of a vehicle failure event (e.g., without providing the criticality menu or the event type menu). For example, an event detector may be capable of determining that a particular but general type of vehicle failure event, but additional, more detailed feedback regarding the vehicle failure event may be requested and entered (e.g., via the user interface 700).

The user interface 700 includes a secondary menu 704 that includes a second plurality of user-selectable icons 706a-f that correspond to more detailed descriptions of a vehicle failure event of a particular type (e.g., the type selected via the event type menu 604 or the type automatically detected by an event detector). As one example, if the human selects icon 606f of FIG. 6, which corresponds to a straight line speed event, then the user interface can transition (e.g., from 600 to 700) to provide a second plurality of icons 706a-f that respectively correspond to more detailed descriptions of straight line speed failure events, such as, for example: too slow, too fast, harsh brake, harsh acceleration, stuck, creeping, etc. If a different one of the icons 606a-g is selected, then different icons can be provided in the secondary menu 704.

In some implementations, selection of one of the second plurality of icons 706a-f can result in transition of the user interface to a tertiary menu that is specific to the selected icon, and so on (e.g., a quaternary menu). Any number of nested hierarchical menus can be used to enable feedback in a streamlined fashion. In some implementations, the feedback menu can auto-dismiss after feedback has been received via a lowest level hierarchical menu.

In some implementations, at least some of the navigational portion 702 can remain within the user interface when the feedback menu (e.g., the secondary menu 704) is provided in the user interface 700.

In some implementations, the icons 706a-f are textual in nature. In other implementations, the icons 706a-f are not textual in nature but instead include a graphical depiction. In some implementations, as illustrated in FIG. 7, the icons 706a-f include both textual and graphical descriptions.

Any other aspects of the user interface 700 (e.g., font, formatting, size, number of icons, type of icons, etc.) can be modified to provide interfaces that are specific to respective vehicle failure event(s).

In some implementations, one or more (e.g., all) of the interactive user interfaces 400-700 can include a visualization of the autonomous vehicle during occurrence of the detected vehicle failure event. As one example, the visualization can visualize or otherwise be generated based at least in part on light detection and ranging data collected by the autonomous vehicle contemporaneous to the occurrence of the vehicle failure event. Providing a visualization of the autonomous vehicle at the time of the detected vehicle failure event within the user interface can enable the human to visually review the vehicle failure event while providing the feedback.

Example Methods

Figure 8:
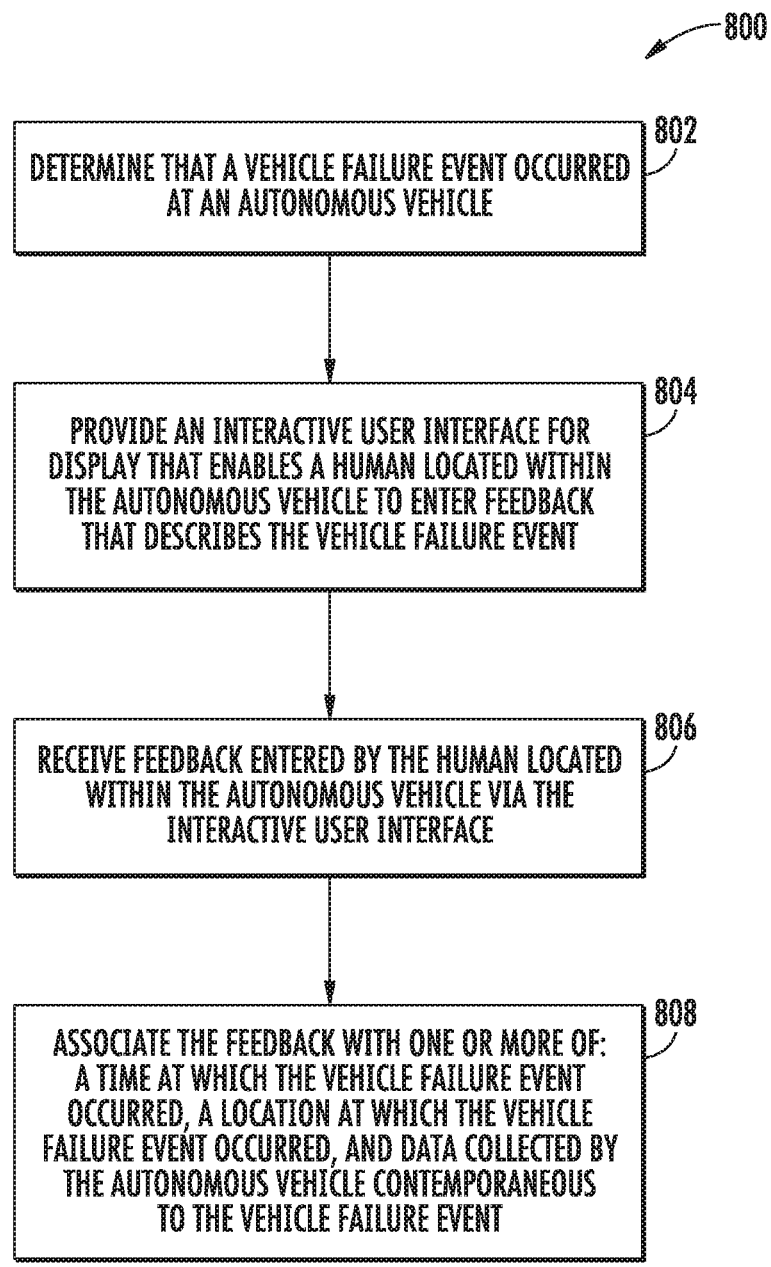
FIG. 8 depicts a flow chart diagram of an example method to obtain autonomous vehicle failure event feedback according to example embodiments of the present disclosure.

FIG. 8 depicts a flow chart diagram of an example method to obtain autonomous vehicle feedback according to example embodiments of the present disclosure.

Although FIG. 8 depicts steps performed in a particular order for purposes of illustration and discussion, the methods of the present disclosure are not limited to the particularly illustrated order or arrangement. The various steps of method 800 can be omitted, rearranged, combined, and/or adapted in various ways without deviating from the scope of the present disclosure.

At 802, a computer system determines that a vehicle failure event occurred at an autonomous vehicle. For example, the computing system can include one or more computing devices that are on-board the autonomous vehicle.

In some implementations, determining at 802 that the vehicle failure event occurred can include detecting that a human intervention event in which a human driver assumed control of the autonomous vehicle occurred at the autonomous vehicle.

In some implementations, determining at 802 that the vehicle failure event occurred can include receiving a human input from the human requesting to enter the feedback. In some implementations, receiving the human input requesting to enter the feedback can include receiving a human selection of a feedback icon presented on an interactive user interface.

At 804, the computer system provides an interactive user interface for display that enables a human located within the autonomous vehicle to enter feedback that describes the vehicle failure event. For example, the interactive user interface can be provided on a front-seat display that is accessible to humans located in a front passenger seat and/or a front driver seat of the autonomous vehicle.

In some implementations, providing the interactive user interface at 804 can include automatically providing the user interface in response to detecting the vehicle failure event at 802.

In some implementations, providing the interactive user interface at 804 can include wirelessly providing the interactive user interface to a handheld computing device associated with the human for display by the handheld computing device.

In some implementations, providing the interactive user interface at 804 can include providing an interactive user interface that includes a plurality of nested hierarchical menus.

In some implementations, providing the interactive user interface at 804 can include providing an interactive user interface that includes both a navigational portion and a feedback portion. The navigational portion can include at least one of navigational instructions and a map. The feedback portion can enable the human located within the autonomous vehicle to enter the feedback that describes the vehicle failure event.

In some implementations, providing the interactive user interface at 804 can include providing an interactive user interface that provides a plurality of user-selectable icons that respectively correspond to a plurality of different types of vehicle failure events. Each user-selectable icon can be selectable by the human to provide the feedback indicative of the corresponding type of vehicle failure event.

At 806, the computer system receives feedback entered by the human located within the autonomous vehicle via the interactive user interface. For example, the user can select one or more icons to provide feedback indicative of the vehicle failure event.

At 808, the computer system associates the feedback with one or more of: a time at which the vehicle failure event occurred, a location at which the vehicle failure event occurred, and data collected by the autonomous vehicle contemporaneous to the vehicle failure event. In some implementations, associating the feedback with one or more of such items at 808 can include storing the passenger feedback in a database or other data representation where it is relationally associated with such one or more items.

In some implementations, providing the interactive user interface at 804 and receiving the feedback at 806 can include providing an interactive user interface that initially enables the human to indicate a criticality level of the vehicle failure event; receiving a user input that indicates the criticality level of the vehicle failure event; and, in response, providing an interactive user interface that provides the plurality of user-selectable icons that respectively, correspond to the plurality of different types of vehicle failure events. In some implementations, the interactive user interface that includes the plurality of user-selectable icons that respectively correspond to the plurality of different types of vehicle failure events is provided only in response to receipt of a user input that indicates that the criticality level of the vehicle failure event is greater than a threshold criticality level.

In some implementations, providing the interactive user interface at 804 can include providing a user interface that includes a secondary menu that includes a second plurality of user-selectable icons that respectively correspond to different descriptions of a selected or detected type of vehicle failure event. Receiving the feedback at 806 can include receiving a user selection of one or more of the second plurality of user-selectable icons.

Collection and association of feedback in such fashion enables advanced recall and analysis of feedback based on time, location, vehicle failure event, vehicle data, other factors, or combinations thereof.

In particular, in another example method, after collection of a significant amount of feedback using the techniques described above, a computing system (e.g., a central computing system) can correlate and combine the feedback data to assess the general performance of a fleet of autonomous vehicles. The performance of the fleet of autonomous vehicles can be assessed according to different metrics and/or across different dimensions or combinations of dimensions. As one arbitrary example, all intersection vehicle failure events between 10 PM and 11 PM in the state of Pennsylvania can be analyzed. As another example, the performance of all vehicles at a single location or set of locations can be analyzed. As another example, an analysis of the aggregate feedback can result in identification of locations where vehicle failure events routinely, occur. This can enable a development team to study and understand the particular factors (e.g., incorrect map data) that led to such consistent failure events at the location. Alternatively or additionally, locations at which aggregate feedback indicate significant amounts of failure events can be marked as off-limits for autonomous vehicles until the issue is resolved.

In particular, one example method of the present disclosure can include aggregating, by a computing system, multiple instances of feedback data received via the interactive user interface relative to multiple detected vehicle failure events over time. The method can further include determining, by the computing system, an aggregate performance score for at least the autonomous vehicle relative to at least one physical location based at least in part on the aggregated multiple instances of feedback data. For example, the aggregate performance score for the location can be an average or other statistical measures of all feedback received for such location.

In another example method of the present disclosure, a computing system can detect that a particular human located within an autonomous vehicle is visiting a location at which the human previously provided feedback or that the particular human is being subjected to a vehicle failure event for which the human previously provided feedback. In response, the computing system can request the human provides new feedback. Receipt of additional feedback can enable the computing system to evaluate of whether any improvement in autonomous vehicle performance has been achieved in the time period between respective feedbacks, as indicated by a change in the feedback.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
   one or more processors; and
   one or more non-transitory computer-readable media that store instructions that are executable to cause the computing system to perform operations, the operations comprising:
      determining that a vehicle failure event has occurred during a ride provided by an autonomous vehicle for a rider;
      in response to determining that the vehicle failure event has occurred, providing an interactive user interface that enables the rider to enter feedback for the vehicle failure event, wherein the interactive user interface comprises a plurality of user-selectable icons that respectively correspond to a plurality of different types of vehicle failure events, the plurality of user-selectable icons being respectively selectable by the rider to provide the feedback indicative of a corresponding type of vehicle failure event;
      receiving the feedback entered by the rider via the interactive user interface; and
      associating the feedback with one or more of: a time at which the vehicle failure event occurred, a location at which the vehicle failure event occurred, or data collected by the autonomous vehicle during the vehicle failure event.

2. The computing system of claim 1, further comprising:
   a front-seat display device that is accessible by both a passenger that is located in a front passenger seat of the autonomous vehicle and a driver that is located in a driver seat of the autonomous vehicle;
   wherein providing the interactive user interface comprises displaying the interactive user interface on the front-seat display device.

3. The computing system of claim 1, wherein providing the interactive user interface comprises wirelessly providing the interactive user interface to a handheld computing device associated with the rider for display by the handheld computing device.

4. The computing system of claim 1, wherein the computing system comprises an autonomy system and a human machine interface device, wherein one or both of the autonomy system and the human machine interface device perform the determining that the vehicle failure event has occurred during the ride provided by the autonomous vehicle.

5. The computing system of claim 1, wherein the computing system comprises a central computing system that is configured to perform additional operations, the additional operations comprising:
  aggregating multiple instances of triage data received via the interactive user interface relative to multiple detected vehicle failure events over time; and
  determining an aggregate performance score for at least the autonomous vehicle relative to at least one physical location based at least in part on the aggregated multiple instances of triage data.

6. The computing system of claim 1, wherein providing the interactive user interface that enables the rider to enter the feedback for the vehicle failure event comprises providing the interactive user interface while the rider is located in the autonomous vehicle.

7. A computer-implemented method to obtain feedback descriptive of autonomous vehicles failures, the method comprising:
  determining, by a computing system comprising one or more computing devices, that a vehicle failure event has occurred during a ride provided by an autonomous vehicle for a rider;
  in response to determining that the vehicle failure event has occurred, providing, by the computing system, an interactive user interface that enables the rider to enter feedback that describes the vehicle failure event, wherein the interactive user interface comprises a plurality of user-selectable icons that respectively correspond to a plurality of different types of vehicle failure events, the plurality of user-selectable icons being respectively selectable by the rider to provide the feedback indicative of a corresponding type of vehicle failure event;
  receiving, by the computing system, the feedback entered by the rider via the interactive user interface; and
  associating, by the computing system, the feedback with one or more of: a time at which the vehicle failure event occurred, a location at which the vehicle failure event occurred, or data collected by the autonomous vehicle during the vehicle failure event.

8. The computer-implemented method of claim 7, wherein providing, by the computing system, the interactive user interface comprises providing, by the computing system, the interactive user interface that includes a plurality of nested hierarchical menus.

9. The computer-implemented method of claim 7, wherein:
  determining, by the computing system, that the vehicle failure event has occurred comprises detecting, by the computing system, that a human intervention event in which a human driver assumed control of the autonomous vehicle has occurred at the autonomous vehicle; and
  providing, by the computing system, the interactive user interface comprises automatically providing, by the computing system, the interactive user interface in response to detecting that the human intervention event occurred.

10. The computer-implemented method of claim 7, wherein:
  determining, by the computing system, that the vehicle failure event occurred comprises receiving, by the computing system, a rider input from the rider requesting to enter the feedback; and
  providing, by the computing system, the interactive user interface comprises transitioning, by the computing system, the interactive user interface to a feedback menu in response to receiving the rider input requesting to enter the feedback.

11. The computer-implemented method of claim 10, wherein receiving, by the computing system, the rider input from the rider requesting to enter the feedback comprises receiving, by the computing system, a rider selection of a feedback icon presented on the interactive user interface.

12. The computer-implemented method of claim 7, wherein providing, by the computing system, the interactive user interface comprises displaying the interactive user interface on a front-seat display device that is accessible by at least one of a front seat passenger located in a front passenger seat of the autonomous vehicle and a driver located in a driver seat of the autonomous vehicle.

13. The computer-implemented method of claim 7, wherein providing, by the computing system, the interactive user interface comprises:
  providing for display, by the computing system, the interactive user interface that initially enables the rider to indicate a criticality level of the vehicle failure event; and
  receiving, by the computing system, a user input that indicates the criticality level of the vehicle failure event; and
  in response to receiving the user input that indicates the criticality level of the vehicle failure event, providing for display, by the computing system, the interactive user interface that provides the plurality of user-selectable icons that respectively correspond to the plurality of different types of vehicle failure events.

14. The computer-implemented method of claim 13, wherein providing for display, by the computing system, the interactive user interface that provides the plurality of user-selectable icons in response to receiving the user input that indicates the criticality level of the vehicle failure event comprises providing for display, by the computing system, the interactive user interface that provides the plurality of user-selectable icons in response to receiving the user input that indicates that the criticality level of the vehicle failure event is greater than a threshold criticality level.

15. The computer-implemented method of claim 7, further comprising:
  in response to receiving the feedback, the feedback being indicative of a selected icon of the plurality of user-selectable icons, causing, by the computing system, the interactive user interface to provide a secondary menu that provides a second plurality of user-selectable icons that respectively correspond to different descriptions of a type of vehicle failure event corresponding to the selected icon.

16. The computer-implemented method of claim 7, wherein providing, by the computing system, the interactive user interface comprises providing for display, by the computing system, the interactive user interface that includes both a navigational portion and a feedback portion, wherein the navigational portion comprises at least one of navigational instructions and a map, and wherein the feedback portion enables the rider located within the autonomous vehicle to enter the feedback that describes the vehicle failure event.

17. The computer-implemented method of claim 7, further comprising: automatically dismissing, by the computing system, a feedback menu of the interactive user interface when feedback is not entered by the rider within a predetermined amount of time.

18. The computer-implemented method of claim 7, further comprising: aggregating, by the computing system, multiple instances of triage data received via the interactive user interface relative to multiple detected vehicle failure events over time; and
   determining, by the computing system, an aggregate performance score for at least the autonomous vehicle relative to at least one physical location based at least in part on the aggregated multiple instances of triage data.

19. The computer-implemented method of claim 7, wherein providing the interactive user interface comprises providing the interactive user interface while the rider is in the autonomous vehicle.

20. One or more non-transitory computer-readable media that store instructions that are executable by one or more processors to cause a computing system to perform operations, the operations comprising:

determining that a vehicle failure event has occurred during a ride provided by an autonomous vehicle for a rider;

in response to determining that the vehicle failure event has occurred, providing an interactive user interface that enables the rider to enter feedback that describes the vehicle failure event, wherein the interactive user interface comprises a plurality of user-selectable icons that respectively correspond to a plurality of different types of vehicle failure events, the plurality of user-selectable icons being respectively selectable by the rider to provide the feedback indicative of a corresponding type of vehicle failure event;

receiving the feedback entered by the rider via the interactive user interface; and associating the feedback with at least one of: a time at which the vehicle failure event occurred, a location at which the vehicle failure event occurred, or data collected by the autonomous vehicle during the vehicle failure event.

* * * * *